US006676342B2

United States Patent
Mast et al.

(10) Patent No.: US 6,676,342 B2
(45) Date of Patent: Jan. 13, 2004

(54) DRILL WITH SPECIALIZED DRILL POINT GEOMETRY

(75) Inventors: Wendell E. Mast, Dundee, OH (US); Joseph P. Nuzzi, Dover, OH (US)

(73) Assignee: Allied Machine & Engineering Corp., Dover, OH (US)

( * ) Notice: Subject to any disclaimer, the term of this patent is extended or adjusted under 35 U.S.C. 154(b) by 85 days.

(21) Appl. No.: 10/042,610

(22) Filed: Jan. 9, 2002

(65) Prior Publication Data

US 2003/0129031 A1 Jul. 10, 2003

(51) Int. Cl.$^7$ .................................................. B23B 51/02
(52) U.S. Cl. ........................................ 408/144; 408/230
(58) Field of Search ................................ 408/227, 229, 408/230, 228, 57, 59, 144

(56) References Cited

U.S. PATENT DOCUMENTS

| | | | | |
|---|---|---|---|---|
| 3,564,947 A | * | 2/1971 | Maier | 408/211 |
| 4,060,335 A | * | 11/1977 | Holloway et al. | 408/233 |
| 4,373,839 A | | 2/1983 | Negishi et al. | |
| 4,381,162 A | * | 4/1983 | Hosoi | 408/1 R |
| 4,583,888 A | * | 4/1986 | Mori et al. | 408/59 |
| 4,659,264 A | | 4/1987 | Friedline | |
| 4,983,079 A | * | 1/1991 | Imanaga et al. | 408/230 |
| 5,078,554 A | * | 1/1992 | Kubota | 408/230 |
| 5,486,075 A | | 1/1996 | Nakamura et al. | |
| 5,716,172 A | | 2/1998 | Nakamura et al. | |
| 5,947,660 A | | 9/1999 | Karlsson et al. | |
| 6,036,410 A | | 3/2000 | Shun'Ko | |
| 6,071,046 A | | 6/2000 | Hecht et al. | |
| 6,135,681 A | | 10/2000 | Nuzzi et al. | |
| 2002/0139587 A1 | | 10/2002 | Mast et al. | |
| 2003/0053873 A1 | * | 3/2003 | Shaffer | 408/230 |

FOREIGN PATENT DOCUMENTS

GB  2 355 219 A  4/2001

OTHER PUBLICATIONS

PCT International Search Report for International Application No. PCT/US02/41487 May 6, 2003.
Frank M. Butrick, "How To Sharpen Spade Drills—Standard and Special," Spade–Drill Engineering Series, 6 pages, (1971).

* cited by examiner

*Primary Examiner*—Daniel W. Howell
(74) *Attorney, Agent, or Firm*—Hahn Loeser & Parks, LLP; Robert J. Clark

(57) ABSTRACT

The present invention relates to a drill having an aggressive drill point geometry. The point geometry allows greater stability and feed rates, while decreasing the heat generated at drill point. The present invention is provided by a drill comprising drill body having at least two helical flutes, a pair of cutting surfaces on an end of the drill body, a web formed between the two cutting edges, and a web thinning notch formed on either side of the web. Each notch forms a notch cutting edge having a positive rake angle.

18 Claims, 2 Drawing Sheets

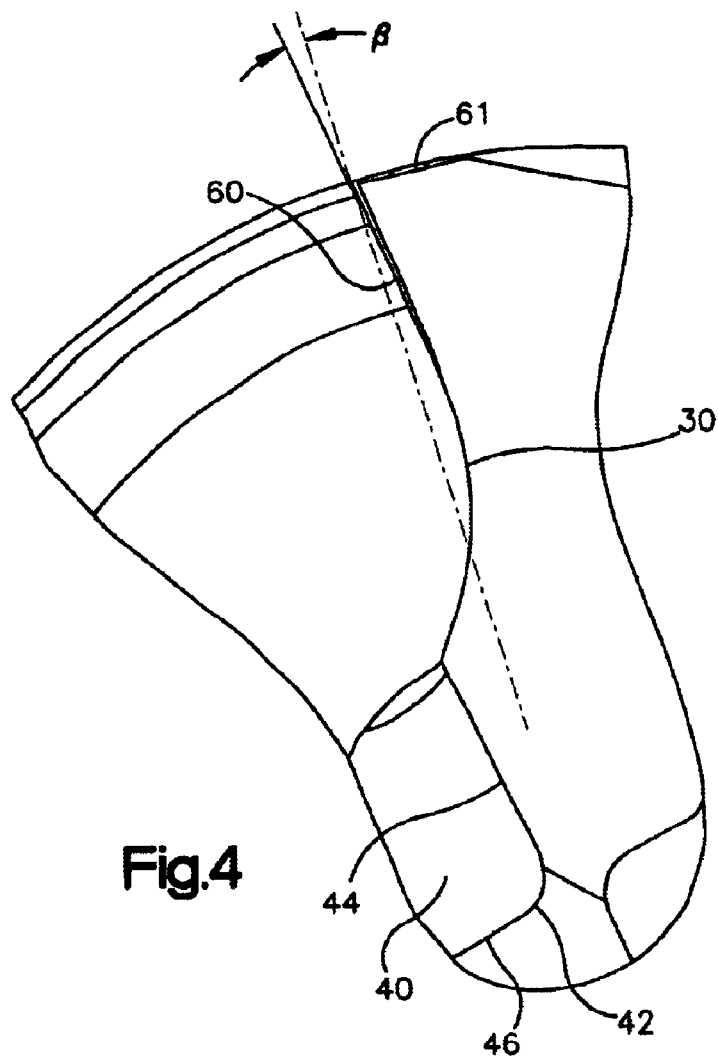
Fig.4
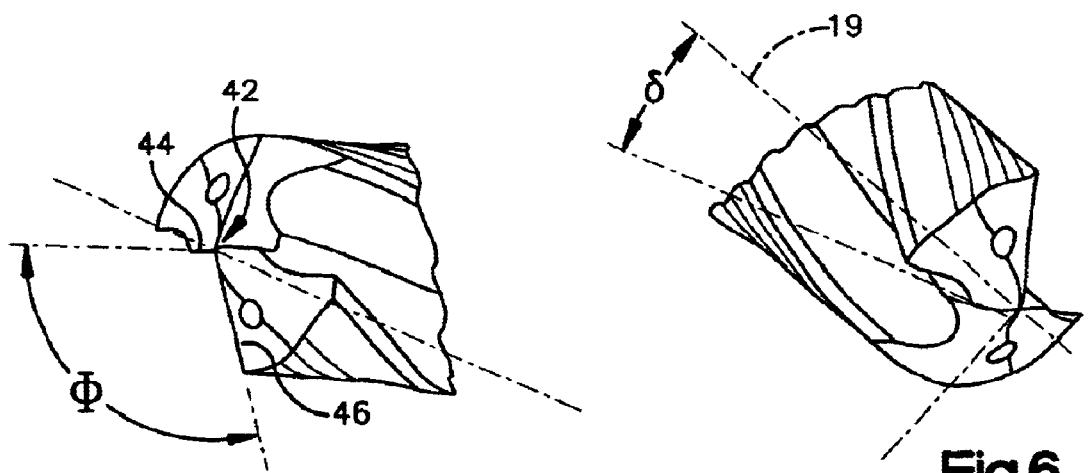
Fig.5
Fig.6

DRILL WITH SPECIALIZED DRILL POINT GEOMETRY

TECHNICAL FIELD

The invention relates generally to a drill having a specialized drill point for boring holes into metals. More specifically the invention relates to a drill having a web-thinning V-notch and aggressive geometry allowing improved centering, faster penetration of the work piece, faster cutting speeds, and improved chip forming geometry.

BACKGROUND OF THE INVENTION

A wide variety of drill point styles are known and particularly adapted for specific drilling tasks. For example, the 118 degree general purpose drill bit is the most commonly used drill point and gives satisfactory results in a wide variety of materials. Another type is the "Racon", or radiused conventional point which forms a relatively large arc with its curved lips and has a rounded lip corner reducing corner wear and eliminating burrs at exit. Split point, or crankshaft drill points are known in the art for being self-centering and requiring less torque and thrust during drilling. The Double Angle point is used in drilling of abrasive materials. The double angle on this point acts as a chamber concentrating tool wear along the entire cutting lip and reducing corner wear. A helical drill point has a "S" shaped chisel making the point self-centering and requiring less torque and thrust.

Regardless of the shape of the chisel or lip curvature, the life of the drill point depends on how well the point dissipates heat. If the point does not adequately conduct heat away from its cutting edges, the temperature buildup will "burn" the point and diminish the life of the drill bit. The heat generated at the lip of the drill point is directly related to the load and stresses the lip is subjected to. The more efficiently load stresses are dissipated, the less heat is built up at the cutting edge of the drill point. The Racon point mentioned above attempts to minimize stress by curving the cutting lip. Although this point does offer an improvement, heat dissipation and wear are still critical concerns in the art.

A problem with these drills is that the center of the drill point at the intersection of the two cutting surfaces forms a chisel. The chisel edges resemble the center ridge of a roof, and cannot be made sharp in the sense that the cutting edges of the drill can be made sharp. The chisel edge is also the most slowly moving part of the drill, being nearest to the center. This combination of inherent dullness and slow speed means that the chisel edges do not so much cut a chip as they plow up or extrude a chip ahead of them. This extruded workpiece material tends to build up in front of the chisel edge, wearing it more quickly than the faster moving and sharper main cutting edges. In order to minimize the effect of the chisel, prior art drill points have been formed with a web thinning gash or notch which reduces the length of the chisel point. However, these notches formed a negative or neutral cutting angle adjacent to the main cutting edge. While generally an improvement, a portion of the main cutting edge was lost and replaced with a longer, but less effective cutting edge. Therefore, there remains a need in the art for a drill having a shorter chisel without an accompanying loss of effective cutting edge surface.

SUMMARY OF THE INVENTION

An object of the present invention to provide an aggressive drill point geometry for a drill. These and other advantages are provided by a drill comprising a drill body having at least two helical flutes, a pair of cutting surfaces on an end of the drill body, each cutting surface having an associated land formed thereon, a web formed between the two cutting edges, and a web thinning notch formed on either side of the web, wherein each notch forms a notch cutting edge having a positive rake angle.

BRIEF DESCRIPTION OF THE DRAWINGS

The invention and developments thereof are described in more detail in the following by way of embodiments with reference to the drawings, in which:

FIG. 4 is a detailed plan view of the drill of the present invention as shown in FIG. 1; and FIGS. 5 and 6 are perspective views of the V-notch portion of the drill of the present invention as shown in FIG. 1.

DETAILED DESCRIPTION OF THE INVENTION

Figure 1:
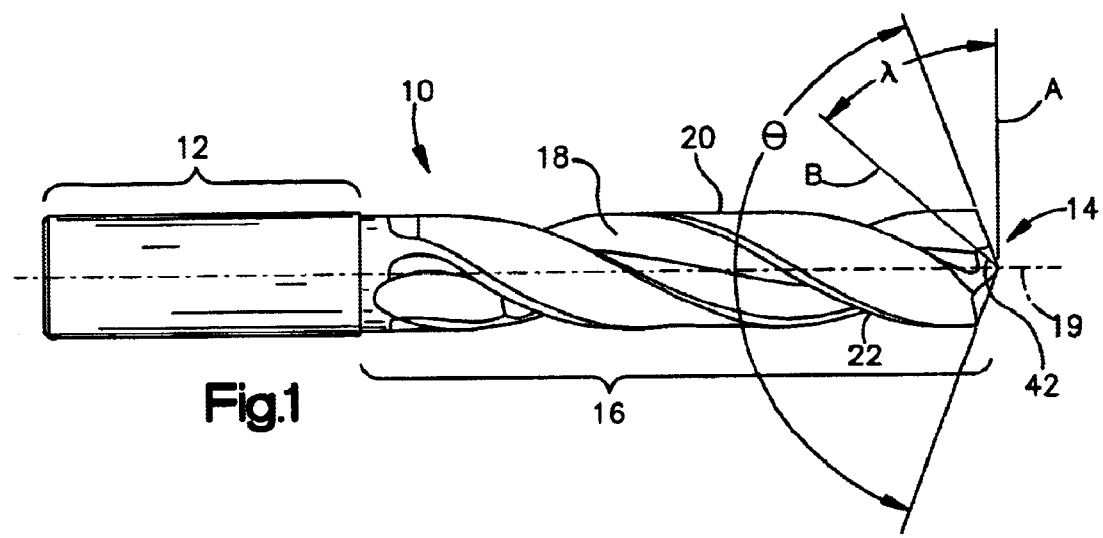
FIG. 1 is a side elevational view of the drill with aggressive point geometry of the present invention.

Turning now to a preferred embodiment of the invention, FIG. 1 illustrates a drill 10 in accordance with the present invention. It is contemplated that the drill 10 is made of a sintered metallic hard material such as solid carbide. However, the drill may be comprised of high speed steel or any other suitable material and is not limited as such. The drill 10 comprises a first end, or shank 12, opposite a second end, or point 14, having a body 16 therebetween, and a rotational axis 19 through the center of the drill 10. The shank 12 is gripped by a rotating device (not shown) to drive the drill 10. The body 16 comprises at least two spiral grooves, or flutes 18 in the form of a helix along opposite sides of body 16 which provides chip evacuation during rotation similar to an auger action. Although the flute helix angle shown is 30 degrees, the invention is not limited to a 30 degree helix angle. In between the flutes 18 are lands 20 which are reduced in diameter except at the leading edge called the margin 22. The reduction in diameter reduces friction between the workpiece and the drill 10. The margin 22, forms a full diameter to aid in supporting and guiding the drill 10. The lands 20 terminate at the point 14 of the drill 10. The point 14 of the drill 10 is generally cone-shaped and is formed at a cone angle or included angle θ.

Figure 2:
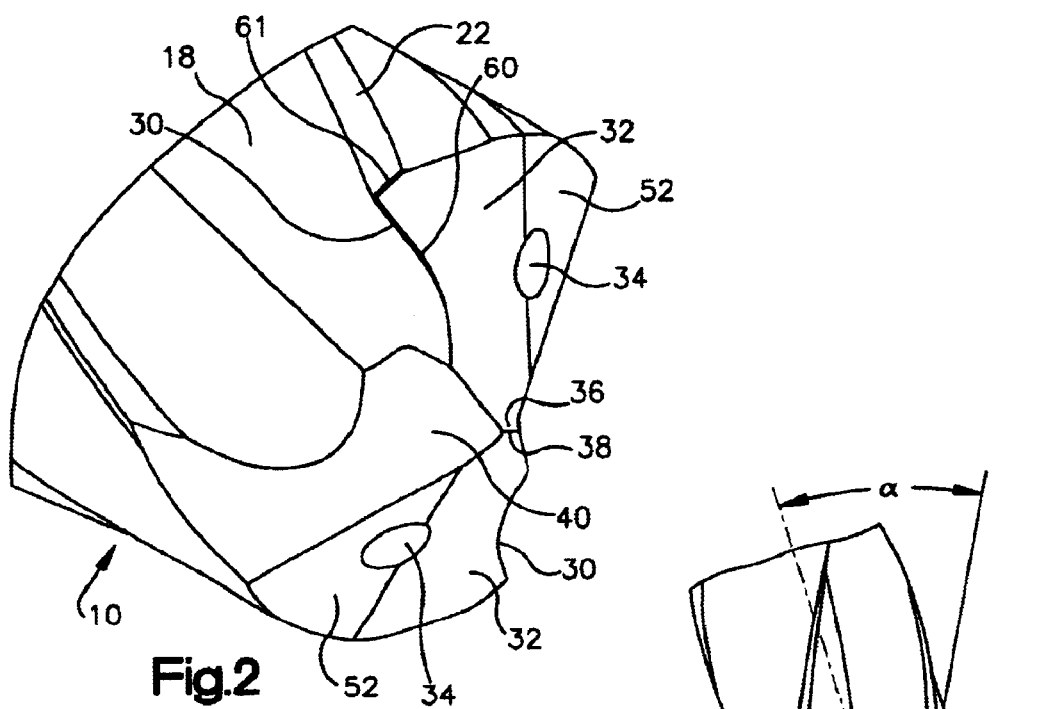
FIG. 2 is a perspective view of the drill point of the drill of the present invention as shown in FIG. 1.
Figure 3:
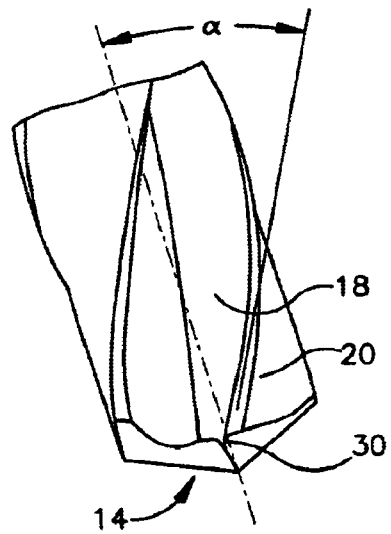
FIG. 3 is a rotated side elevational view taken along the leading edge of the cutting edge of the drill of the present invention as shown in FIG. 1.

Referring now to FIG. 2, the point 14 comprises two lips or cutting edges 30 formed at the interface of the clearance 32 and the flutes 18. The cutting edges 30 are formed as a curved or helical lip which helps reduce stress during operation similar to the Racon drill point. The cutting edges 30 form a positive rake angle (not shown) due to the interface of the helical flutes 18 and the cone-shaped point 14 which is best shown in FIG. 3 which depicts the axial rake angle α and FIG. 4 which shows the radial rake angle β.

Referring again to FIG. 2, the point further comprises a primary clearance surface 32 behind each cutting edge 30 which is formed at a primary clearance angle (not shown) such that only the cutting edges 30 are in contact with the material to be cut. A secondary clearance surface 52 may also be formed adjacent the primary clearance surface 32 at a steeper angle (not shown) to provide additional clearance behind the cutting edges 30. The clearance surfaces 32, 52 prevent additional friction during the cutting operation and provide additional room for facilitating the removal of chips cut from the material. The drill 10 may also include flush channels 34 typically formed through the entire length of the drill 10 and terminating at the clearance surfaces 32, 52 of the point 14. The flush channels 34 carry coolant fluid to help cool the drill 10 and to flush and transport chips out of the hole through the flutes 18.

The point 14 of drill 10 further comprises the area between the flutes 18 which is generally referred to as the web 36. The intersection of the clearance 40 and the cone produces a straight line chisel 38 and forms a negative rake angle with the conical surface. As previously mentioned, the negative rake angle chisel 38 does not cut efficiently. In order to minimize the effect of the chisel 38, the present invention utilizes a web-thinning, V shaped notch, or gash 40 which reduces the length of the chisel 38. The V shaped notch 40, referred hereafter as the V-notch 40, is generally shaped like a "V" and will be discussed in further detail below.

In one embodiment of the present invention, the point 14 comprises cutting edges 32 having a Land 60 on at least a portion of the cutting edge 32 in order to further improve the cutting performance of the tool 10. A land 60 is a straight or tapered edge prep of the relief wall and rake face as it is frequently desirable to provide a chamfer along the cutting edge 30 of a cutting tool 10 in order to reduce stress concentration encountered during use, thereby preventing edge chipping and increasing tool life. Although a K-land 60 is shown, the present invention is not limited to a particular type of edge preparation or land. The edge prep, or land 60, is defined by the angle it makes with the rake face of the cutting tool, and its width, i.e., the distance in the plane of the tool's rake face from the beginning of the land portion thereon to the edge generated by the intersection of the land portion and the clearance surface 32 of the tool. Similarly, a corner break 61 may be provided at the interface of the margin 22 and the point 14. The corner break 61 as shown is a chamfer or clip, but may also be formed as a radius. The corner break 61 helps prevent corner edge chipping and premature wear, thereby increasing the life of the tool 10. The corner break 61 also helps reduce heat concentrations that are associated with a sharp edge.

Referring now to FIG. 4, another feature of the cutting edges 30 is that in addition to the lip formed as a positive rake angle in the direction normal to the point surface 14, a radial outward portion of the cutting edge 30 is formed as a positive rake angle β in a radial direction. The positive radial rake angle β results in chip formation and chip movement radially inward as opposed to typical drill point geometries which are designed to move the chips radially outward.

The V-notch 40, is shaped like a "V" having a radiused trough 42 at the bottom of the V-notch 40 and a first generally planar side 44 on a leading side of trough 42 and a second generally planar side 46 on the opposite side, or trailing side of the trough 42 as also shown in FIG. 5. The first side 44 and second side 46 are at an angle φ with respect to each other. Like the prior art web-thinning techniques, the V-notch also reduces the length of the cutting edges 30 as the leading side 44 of the V-notch 40 is cut into a portion of the cutting edge 30 such a reduction also reduces the width of the chips making it easier to evacuate the chips, as best shown in FIG. 4. However, the V-notch 40 of the present invention is formed such that the trough 42 of the V-notch 40 is at a compound angle with respect to axis 19 such that the leading edge 44 of the V-notch 40 forms a positive rake angle. As shown in FIGS. 1 and 6, trough 42 is formed longitudinally as a compound curve at a skew angle λ between the centerline B of trough 42 and a line A perpendicular to the axis 19 of the drill 10. The trough 42 is also formed at a tilt angle δ with respect to axis 19 normal to the skew angle λ as shown in FIG. 6. The resulting formation of the positive rake angle on the V-notch 40 actually extends the effective positive rake angle cutting edge length of drill 10. The multiple cutting edges 30, 44, aggressively bite into the material to be drilled as the drill 10 rotates. Additionally, the positive rake angle cutting edge 44 results in enhanced self-centering of the drill tool 10 by providing an aggressive geometry which bites into the material adjacent the chisel. The negative or neutral prior art web thinning techniques allowed the drill point to "walk" along the surface of the material to be cut, thus moving the drill away from the desired location, or resulted in bell-mouthing of the drill hole entrance.

The trailing side 46 of the V-notch 40 is generally cut into either the primary clearance surface 32 (when the drill is formed with only one clearance surface) or in the secondary clearance 52 as shown in the figures of the present invention. The trailing side 46 forms an additional clearance surface, shown adjacent the secondary clearance surface 52 at a tertiary clearance angle (not shown) and helps improve chip removal from the drill 10. Accordingly, the flush channels 34 work in conjunction with the drill point geometry to efficiently remove chips from the hole. The drill point geometry pushes the chips radially inward toward the flutes 18 while the flush liquid flows along the clearance surfaces 32, 52, through the V-notch 40 and into the flutes 18 and out of the hole. The V-notch 40 location and shape help in chip formation and removal. Leading edge 44 of the V-notch 40 cuts the material, the chips are curled as they hit the trailing side 46 of the V-notch 40.

As previously mentioned, the cutting edges 30 have a positive axial rake angle α, a positive radial rake angle β, and are curved as the edges 30 move radially inward. The V-notch also has a positive rake angle and a shape conducive to curling and breaking the chips. These curl up the chips formed in front of the cutting edges 30, 44, and help break them up and send them down the flutes and ultimately out of the hole. The process is aided by coolant holes 34, one formed through the clearance surfaces 32, 52, just ahead of the V-notch. Pressurized coolant pumped down the holes 34 flushes the chips off the cutting edges 30, 44, and out of the hole. In the point geometry configuration of the present invention, the chisel edge 38 lies totally behind the cutting edge 30 that precedes it, next to the V-notch 40. This configuration provides an easy exit path for the material plowed up ahead of the chisel edge 38, which can flow down the clearances surfaces 32, 52, behind the cutting edge 30 and into the adjacent V-notch 40.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A drill comprising:
   a drill body having a shank at one end and a drill point at an opposite end thereof;
   wherein the drill point comprises at least two curved cutting edges, a web formed between the two cutting edges, and a single web thinning notch formed on either side of the web;

wherein each cutting edge has an associated edge preparation formed thereon;

wherein each notch forms a notch cutting edge adjacent to and radially inward from one cutting edge of the at least two cutting edges, wherein each notch cutting edge has a positive axial rake angle;

wherein the notch has a cross-sectional geometry in the form of a "V" having a radius at the apex of the notch and transitioning to substantially planar side walls.

2. A drill comprising:

a drill body having at least two helical flutes;

a pair of curved cutting edges formed transverse to each other on an end of the drill body;

a web formed between the two cutting edges;

a web thinning notch formed on either side of the web, each notch forming a notch cutting edge having a positive rake angle;

wherein the notch has a cross-sectional geometry in the form of a "V" having a radius at the apex of the notch and transitioning to substantially planar side walls.

3. The drill of claim 2, wherein the notch cutting edge is formed by at least one planar side wall of the notch.

4. The drill of claim 2, wherein the apex of the notch is formed along an angle transverse to a rotational axis of the drill body.

5. The drill of claim 2 further comprising a chamfer at the interface of the margin and the point forming a corner clip.

6. The drill of claim 2 further comprising a radius at the interface of the margin and the point forming a corner break.

7. The drill of claim 2, wherein the drill further comprises at least a primary clearance surface trailing each cutting edge.

8. The drill of claim 2, wherein the drill further comprises at least a primary clearance surface and a secondary clearance surface trailing each cutting edge.

9. The drill of claim 2, wherein the cutting edges have a positive radial rake angle to direct chips toward the center of the drill.

10. The drill of claim 2, wherein at least a portion of the cutting edges have a positive axial rake angle.

11. The drill of claim 1, wherein the drill is comprised of a sintered metallic hard material.

12. The drill of claim 11, wherein the drill body is comprised of a material selected from the group consisting of carbide, cermet, ceramic, monocrystalline and polycrystalline diamond, particle metal, and boron nitride.

13. The drill of claim 1 further comprising a chisel formed across the web; and wherein the radius at the apex of the notch is adjacent the chisel.

14. The drill of claim 1, wherein the cutting edges have a positive rake angle; and wherein at least a portion of the cutting edges have a positive axial rake angle.

15. The drill of claim 1, wherein the notch cutting edge is formed by at least one planar side wall of the notch.

16. The drill of claim 1, wherein the apex of the notch is formed along an angle transverse to a rotational axis of the drill body.

17. The drill of claim 1, wherein the edge preparation formed on the cutting edges is a land.

18. The drill of claim 1 further comprising flush channels.

* * * * *